United States Patent

[11] 3,549,924

| [72] | Inventor | Hans-Christof Klein |
| | | Hattersheim am Main, Germany |
| [21] | Appl. No. | 762,525 |
| [22] | Filed | Sept. 25, 1968 |
| [45] | Patented | Dec. 22, 1970 |
| [73] | Assignee | Alfred Teves G,m.b.H., |
| | | Franklin am Main, Germany |
| | | a corporation of Germany |
| [32] | Priority | Sept. 26, 1967 |
| [33] | | Germany |
| [31] | | No. T34889 |

[54] EDDY-CURRENT TACHOMETERS FOR VEHICULAR BRAKE SYSTEMS AND THE LIKE
9 Claims, 5 Drawing Figs.

[52] U.S. Cl..................................... 310/168,
310/156, 310/181, 310/266
[51] Int. Cl...................................... H02k 19/20,
H02k 19/24
[50] Field of Search........................... 310/68, 44,
66, 75, 75, 2, 67, 75, 3, 77, 156, 168, 171, 181, 266,
261, 268

[56] References Cited
UNITED STATES PATENTS

| 3,431,444 | 3/1969 | Wilson | 310/168 |
| 3,383,533 | 5/1968 | Jarret | 310/168 |
| 3,320,454 | 5/1967 | Kober | 310/156 |
| 3,248,584 | 4/1966 | Knauer | 310/171 |
| 3,215,876 | 11/1965 | Nichols | 310/156 |
| 2,947,933 | 8/1960 | Davis | 310/171 |
| 2,913,819 | 11/1959 | Andreotti | 310/44 |
| 2,847,594 | 8/1958 | Cohen | 310/266 |

*Primary Examiner*—Milton O. Hirshfield
*Assistant Examiner*—R. Skudy
*Attorney*—Karl F. Ross ABSTRACT: A tachometer, especially for antiskid brake-control systems, in which a stationary eddy-current disk is mounted in the tachometer housing and is flanked by a pair of rotatable magnetic portions of the tachometer rotor which is driven by the vehicle wheel. The disk is provided with openings between the inner and outer peripheries to which the output terminals of the system are respectively attached.

HANS-CHRISTOF KLEIN
INVENTOR.

BY Karl F. Ross

ATTORNEY

HANS-CHRISTOF KLEIN
INVENTOR.

BY Karl F. Ross
ATTORNEY

EDDY-CURRENT TACHOMETERS FOR VEHICULAR BRAKE SYSTEMS AND THE LIKE

My present invention relates to an eddy-current tachometer and, more particularly, to an eddy-current device for the control of antiskid brake regulators of automotive vehicles.

In my commonly assigned copending application Ser. No. 760,769 filed Sept. 19, 1968, now U.S. Pat. No. 3,532,391 and entitled "NONSKID BRAKE SYSTEM HAVING HIGH-PRESSURE ACCUMULATOR AND RECIPROCATING PUMP" and in the commonly assigned copending application Ser. No. 758,022 filed Sept. 6, 1968 entitled "ACCELEROMETER," principles of antiskid brake-regulating systems have been described. In general, such systems include, in addition to the usual brake-actuating means in the form of a master cylinder or driver-operated valve for delivering brake-fluid pressure to the brake lines and wheel-brake cylinders of disc-type or drum-type wheel brakes, a mechanism coupled with the braked wheels and responsive to the angular acceleration or velocity thereof for regulating the braking force delivered to the wheel brakes in order to prevent their locking.

The systems are based upon the principle that the primary dissipation of the vehicle energy should take place at the braking surfaces of the wheel brakes rather than between the wheels and the road surface. Consequently, the tendency toward locking of the brakes, which is common when the brakes are applied rapidly to a heavy-duty rapidly moving vehicle, is counteracted by the control system which responds to the velocity or acceleration of the wheels and reduces the braking force when angular velocity decreases unduly or terminates while the vehicle remains in operation. Locking of the wheels during continued movement of the vehicle, of course, corresponds to a skid which removes control from the operator and creates a highly dangerous situation. Similarly, when the deceleration rate exceeds the prescribed level, another indication of a tendency toward brake locking, or terminates entirely (corresponding to a skid condition), the system responds to reduce the pressure applied by the master cylinder or valve to the wheel brakes or even to drain the latter into a reservoir.

The control devices for such purposes may include accelerometers such as have been described in the last-mentioned copending application and which are inertial arrangements producing an electrical output proportional to the lag of a mass indirectly coupled with the wheel. In the first-mentioned application, however, systems are described which derive the acceleration signal from a velocity-responsive device. In this case, a continuous signal proportional to angular velocity may be subjected to differentiation with respect to time to yield acceleration (or deceleration) directly or to other mathematical treatments to yield a function proportional to acceleration.

While it has been proposed to measure angular velocity with the aid of eddy-current tachometers heretofore, such devices have generally required slip rings for electrical energization of a rotating member or for the tapping of the output signal from such rotating members, or have constructed so as to be ineffective with wheel-brake systems of the character described.

It is, therefore, the principal object of the present invention to provide a highly compact tachometric device responsive to angular velocity which avoids the aforementioned disadvantages and yet can be mounted so as to be effective in systems of the character described.

Another object of this invention is to provide a tachometer of the character described which avoids the need for slip rings and other rotating members and which is of compact configuration so as to be mountable in the region of the vehicle wheel for producing an output proportional to the angular velocity thereof.

Still another object of this invention is to provide an antiskid brake-control system having a novel tachometric input device.

According to a feature of this invention, the tachometric device comprises a rotatable magnet member coupled with the wheel of the vehicle while the stator member in which the eddy-current output is generated is a disc rigid with the vehicle body or chassis. The terminals through which the induced-electrical output is tapped from the device are fixed to the electrically conductive disc.

Preferably, the disc-shaped rotor member is substantially annular while the magnetic member passes through the center of this disc and is rotatable coaxially therewith. To this end, the magnetic member is constituted with a central hub and a pair of angular flanges in an axially spaced relationship flanking the stationary ring which is thus received in a radially open channel of the magnet member lying in a plane thereof perpendicular to the axis of rotation of the magnetic member.

The magnetic member is so polarized that the flanges constitute the opposed magnetic poles while the disc is relatively thin and closely spaced from these poles so that the magnetic losses are minimal. The stationary disc is held along its outer periphery and reaches inwardly into the angular channel to substantially fit the cross section thereof. The disc is preferably constituted of a ferromagnetic material.

According to a further feature of this invention, the means for tapping the electrical output of the device includes an inner insulated terminal and an outer uninsulated terminal which respectively are secured in electrically conducting relationship to the outer periphery and the inner periphery of the disc. The latter is formed with a multiplicity of cutouts or windows in the web between the inner and outer peripheries. Advantageously, the stationary disc has at least one radial bore through which the inner terminal is connected to the brake-insulating system via an insulated cable. The insulated cable may, moreover, be surrounded by ferromagnetic material to preclude the spurious induction of electric current in the cable itself, thereby providing a false indication of the velocity of the wheel.

The above and other objects, features and advantages of the present invention will become more readily apparent from the following description, reference being made to the accompanying drawing in which.

Figure 1:
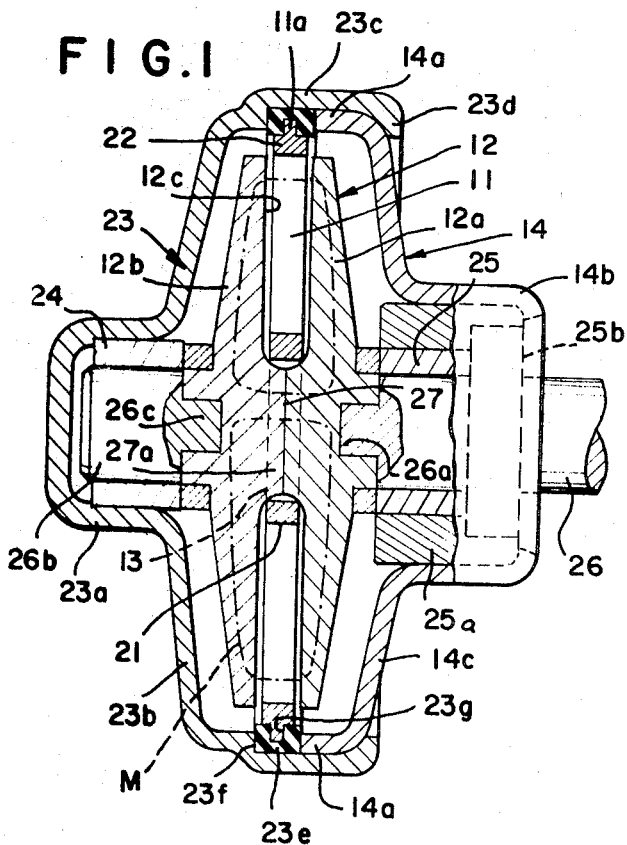
FIG. 1 is an axial cross-sectional view through an eddy-current tachometer according to this invention.
Figure 2:
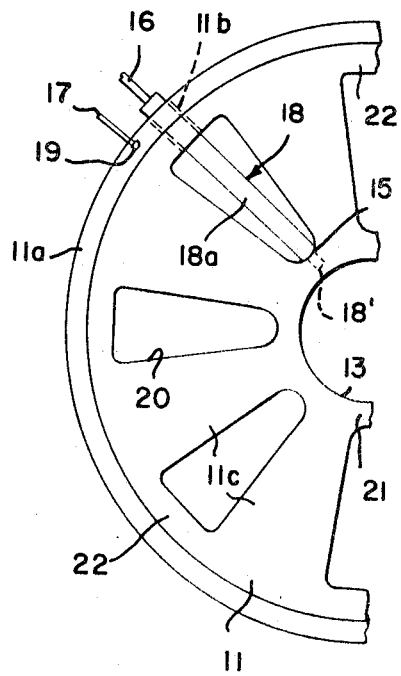
FIG. 2 is a side elevational view of the stationary disc of this tachometer.

The eddy-current tachometer illustrated in FIGS. 1 and 2 comprises a housing 23 of cup-shaped configuration mounted upon the vehicle body and the chassis. The housing 23 has a drawn cylindrical base 23a from which the frustoconical shell 23b flares outwardly and to the right (FIG. 1) to terminate in a cylindrical flange 23c whose lip 23d can be bent inwardly to lock a second housing cup 14 in place.

A retaining ring 23e of electrically insulating material is clamped by the cylindrical flange 14a of the cup 14 against a shoulder 23f in the interior of the cylindrical portion 23c of housing member 23 and has an inwardly open peripheral channel 23f in which an outwardly extending flange 11a of the outer periphery of a stationary disc 11 is anchored.

The stationary disc 11 of conductive material (e.g. ferromagnetic) extends inwardly and has a central opening 13 surrounded by the inner peripheral portion 21 of the disc The outer peripheral portion is represented at 22. The rotor disc 11 may be stamped from sheet metal of ferromagnetic composition and preferably has the composition of the metal laminates used in dynamo and transformer construction.

The housing member 14 has a cylindrical base 14b which continues into a frustoconical flaring portion 14c terminating in the cylindrical flange 14a mentioned earlier. Along the axis of the housing 14, 23, there are provided a pair of axially spaced bearings 24 and 25, the former being anchored in the cylindrical base 23a while the latter is received in an outer bearing ring 25a having a contaminant-excluding cylinder 25b. The bearings 24 and 25 rotatably support a shaft 26 which is coupled with a vehicle wheel (see FIG. 5) and which, in turn, carries a permanent magnet 12 via a prismatic stub 26a.

On the other side of the magnet 12, a shaft extension 26b is provided to support the magnet in the bearing 24 and is affixed to the magnet via the prismatic stub 26c (FIG. 1). Thus the magnet 12 is rotationally entrained by the shaft 26.

The magnet 12 comprises a pair of axially spaced annular radial flanges 12a and 12b of outwardly tapering cross section and constituting the two poles of the permanent magnet. The flanges 12a and 12b are magnetically joined at a hub 27 and define between them a narrow outwardly open annular channel 12c in which the disc 11 is received with slight clearance. The magnetic circuit is represented by the dot-dash line M and extends from the hub 27 through the magnetic arms represented by flanges 12a and 12b across the gap 12c.

Figure 5:
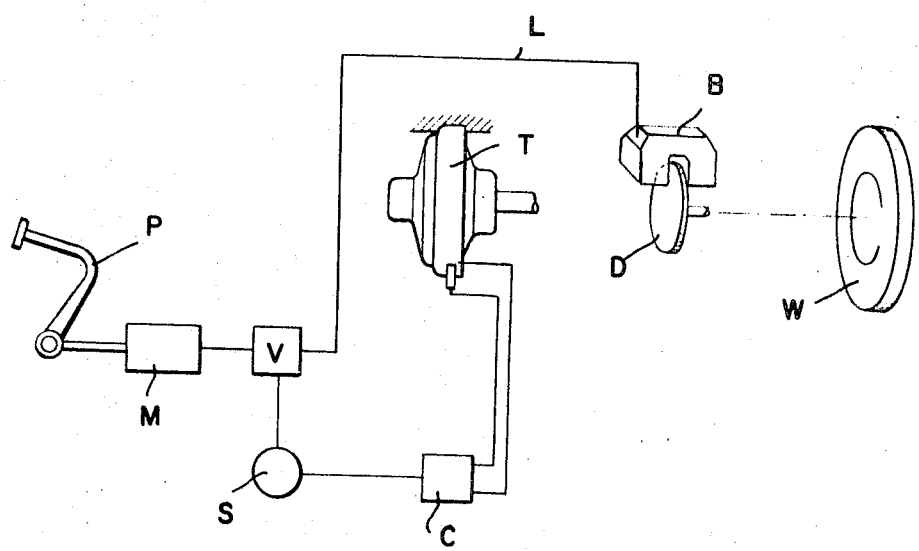
FIG. 5 is a diagram representing a brake-regulating system using a device according to FIGS. 1 through 4.

As can be seen from FIG. 2, the disc 11 is provided with a radial bore 11b through which an insulated cable 18 extends so that its conductive lead 18' is soldered to the inner periphery 21 of the disc, the cable 18 having a terminal 16 externally of the device connectable as shown in FIG. 5 to a control system for brake regulation. The sheath 18a of the cable may be composed of ferromagnetic material, thereby preventing spurious indication of current in the leads 15, 16. The second terminal of the system is represented at 17 and is soldered at 19 to the flange 11a of the disc 11. Terminals 16 and 17 pass through leadout insulators (not shown) in the wall 23c of the housing. The stationary annular disc 11 is formed with radially outwardly tapering cutouts 20 in the web joining the inner peripheral portion 21 with the outer peripheral portion 22 so that ribs 11c are formed between these peripheral portions and frame the cutouts 20. The radial cutouts extend only sufficiently to exclude the peripheral portions 21 and 22, thereby restricting minor eddy-current moves which would detract from the output of the device. The magnet 12 shown in FIG. 1 comprises two magnetic cups which form an interface 27a in the hub 27, the two hubs being bonded into magnetic unity by welding, soldering or friction-welding in a conventional manner. The magnetic bodies are preferably composed of a ferromagnetic powder (e.g. ferrite) pressed into the illustrated configuration and sintered. It has been found to be desirable to use the disc 11 as a core and sandwich this disc between two thin layers of an antibonding synthetic resin and thereafter press the magnet 12 around the disc 11. Withdrawal of the synthetic resin layers leaves the minute clearance found to be desirable between members 11 and 12. Instead of subsequent withdrawal of the foils, they may be thermally destructible (i.e. thermoplastic) so that during the sintering process they are eliminated in situ to leave the required gaps. The shafts 26 and 26b may be inserted thereafter under pressure.

As indicated earlier, the tachometric device of FIGS. 1 and 2 is particularly suited for antiskid brake-control systems which are represented in FIG. 5 in highly generalized form.

In FIG. 5 I have shown a vehicle body W which is provided with the usual brake disc D of a disc brake B supplied with hydraulic fluid via a line L from a master cell M. A servo-operated valve V is interposed between the master cell M and the brake B and is operated by servomotor S responsive to the output of a differentiating circuit C as will be apparent hereinafter. Under normal brake operations, the brake pedal P is depressed to force brake fluid from the master cell M through the valve V in a position of the latter in which normal brake-fluid transmission is permitted, through the line L to the disc brake B which engages the disc D and reduces the velocity of the wheel W. The tachometer T, which is of the type shown in FIGS. 1 through 4, senses the angular velocity of the wheel W and produces a continuous electrical signal with a potential proportional to the angular velocity. This signal is applied to a differentiating circuit C (or some other analyzing network as described in my aforementioned copending application) to yield the time derivative of the velocity 4 or deceleration of the wheel. Should the deceleration drop to a level corresponding to locking of wheel W and, consequently, to a skid condition, servomotor S operates valve V to reduce the brake pressure in line L and disc brake B and thereby restore normal braking procedure.

The system of FIGS. 1 and 2 has been found to be highly effective for systems of this type, for example, when the confronting surfaces of members 11 and 12 have a magnetic effective area (crossed by the magnetic flux) of 64 cm.$^2$ and the magnet has a remanence (residual magnetism) of 10,000 gauss, the voltage appearing across the terminals 16, 17 is related to the angular velocity at the shaft 26 as follows:

0001

| Angular velocity, r.p.m.: | Electrical output, mv. |
|---|---|
| 100 | 10.6 |
| 500 | 53 |
| 1,000 | 106 |
| 1,500 | 159 |
| 2,000 | 212 |

With steel and iron, it is possible to realize residual magnetization of up to 12,000 gauss without special effort. When higher residual magnetisms are required, special magnetic compositions well known in the art may be used.

Figure 3:
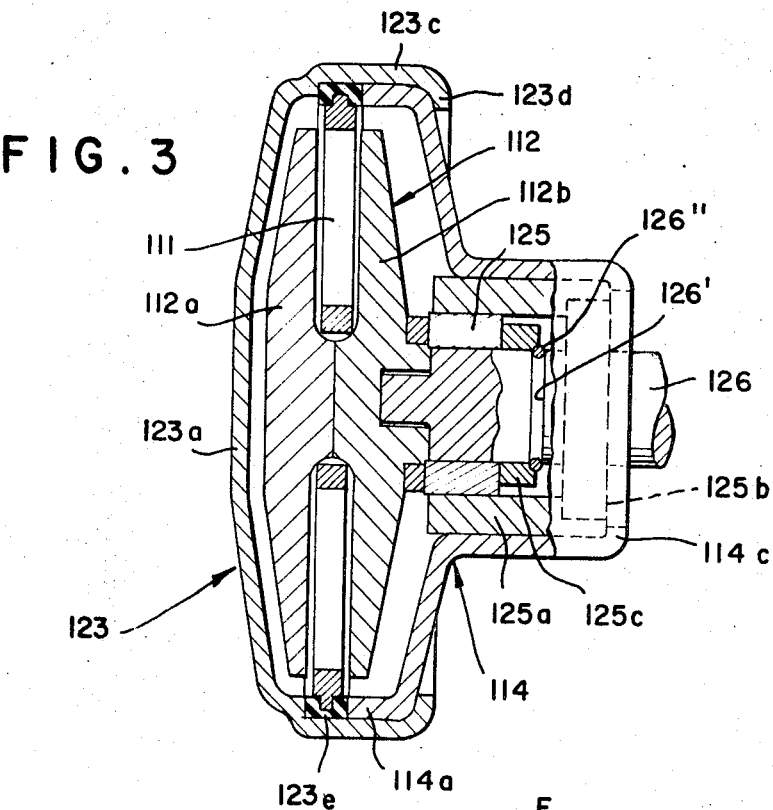
FIG. 3 is a cross section through another tachometric device according to my invention.

In FIG. 3, I show a more compact system in which the housing 123, 114 is constructed somewhat differently from the system of FIGS. 1 and 2. The outer housing member 123, however, has a substantially flat disc-shaped body 123a whose cylindrical flange 123c is crimped at 123d about the housing member 114 constituted as shown in FIG. 1. Thus the cylindrical rim 114a of the inner housing member locks the mounting ring 123e in place and is formed with a base 114b holding the bearing 125, 125a. In this embodiment, the two-part magnet 112, which has the configuration shown in FIG. 1, is provided with a pair of flanges 112a and 112b flanking the disc-shaped member 111 of the configuration previously described. The assembly 111, 112 may be produced by pressing and sintering with destruction of the thermoplastic foils or spacers as also described previously.

The simplified mounting of the assembly of FIG. 3 includes a spacer ring 125b interposed between the flange 112b and the bearing 125 which is rotatably received in the bearing 125a and is rotatable with a shaft 126. The latter has a groove 126' in which a spring ring 126" is anchored to hold a spacer ring 125c against the bearing 125. Movement of the assembly to the right is prevented by the leave 114c of the housing. A seal may surround the shaft 126 as described in connection with FIG. 1. In this case, the shaft and bearing structure at 26b, 24 can be omitted. Otherwise the system of FIG. 3 operates as described in connection with FIGS. 1, 2 and 5.

Figure 4:
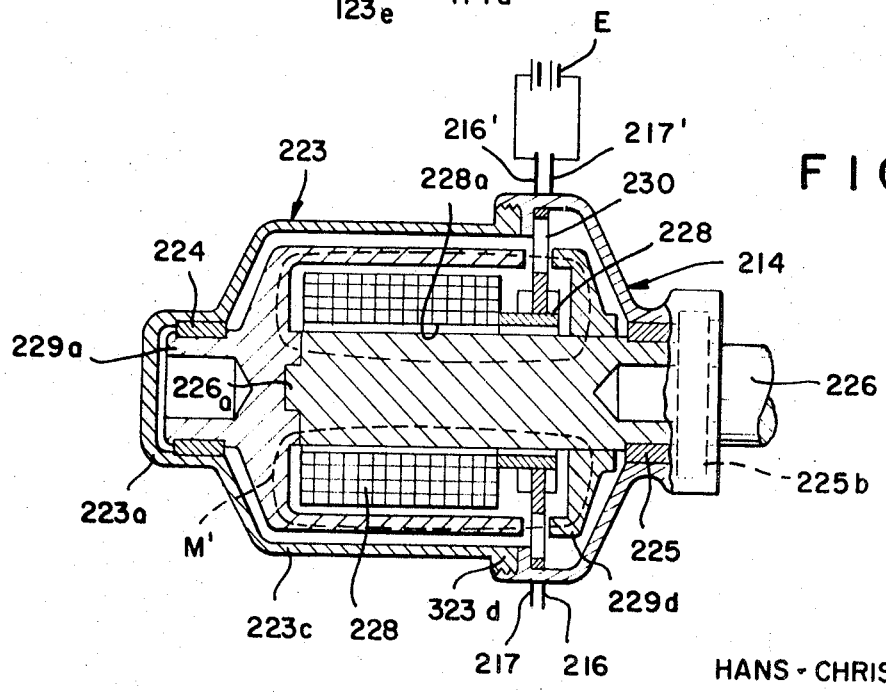
FIG. 4 is an axial cross-sectional view through a system operating with an electromagnet.

In FIG. 4, I show a system in which slip rings are avoided in spite of the fact that an electrically energized coil is used. In this arrangement, the cup-shaped housing 123 has an axially extending elongated cylindrical portion 223c, the mount of which is formed with a rim 223d threaded into the mouth of cover 214. A base 223a at the closed end of the cup 223 receives a bearing 224 which rotatably supports a base 229a of a cylindrically soft-magnetic body 229 constituting a yoke whose core is formed by the shaft 226.

The shaft 226 has a projection 226a passing through a magnetic coil 228 which is coaxial with a shaft 226 and surrounds the latter with a slight clearance 228a. The coil 228 is, in turn, surrounded by the cylindrical wall 229b of a magnetic body 229 whose outer lip 229c confronts the stationary disc 211 of a construction and configuration as described in connection with FIGS. 1 through 3. The other magnetic member is formed by an iron disc 229d separated by gap 230 from the disc 211 and mounted on the shaft 226 for rotation therewith. The coil 228 can be energized by DC source E, e.g. the vehicle battery via leads 216' and 217' passing through a bore analogous to that shown at 11b in FIG. 2 at the coil 228. The latter is mounted upon a sleeve 228b carried by the ring 211. As indicated earlier, the bell-shaped members 229 and 229d complete with the shaft 229 a magnetic circuit represented by the dot-dash line M across the gap 230 to induce electric current in the disc 211. The latter is anchored in the housing portion 214 which also receives a bearing 225 for the shaft 226 and a cylinder 225b preventing entry of contaminants into the system. Terminals 216 and 217, analogous to the terminals 216 and 217 of FIG. 2 are provided to tap the voltage proportional to the angular velocity of the shaft 226.

The improvement described and illustrated is believed to admit of many modifications within the ability of persons skilled in the art, all such modifications being considered within the spirit and scope of the invention except as limited by the appended claims.

I claim:

1. A vortex tachometer for producing an electrical signal proportional to the angular velocity of a rotating body, comprising a stationary housing surrounding an axis; an annular winding-free electrically conducted induction disc mounted nonrotatably in said housing and lying in a plane perpendicular to said axis; a magnetic member coupled with said body and rotatable in said housing while extending through said disc and having a pair of confronting magnetic poles flanking same for generating a magnetic field across said disc to induce an electric current in said disc; and conductor means for tapping an electrical output from said disc connected to radially spaced locations thereon, said disc having a continuous outer periphery secured to said housing and continuous inner periphery, said disc being formed with windows between said peripheries and with webs connecting said peripheries between said windows, at least part of said member passing through said disc and being surrounded by said inner periphery, said conductor means including leads respectively secured to said inner and outer peripheries.

2. The tachometer defined in claim 1 wherein said disc is annular and has an outer periphery secured to said housing and an inner periphery, at least part of said member passing through said disc and being surrounded by said inner periphery, said conductor means including leads respectively secured to said inner and outer peripheries.

3. The tachometer defined in claim 1 wherein said disc is formed with a plurality of angularly equispaced openings forming said windows between said inner and outer peripheries.

4. The tachometer defined in claim 2 wherein said magnetic member comprises a body of magnetic material having a hub extending through said disc and a pair of annular radial flanges of opposite magnetic polarity flanking said disc and closely spaced therefrom, said body being formed with an outwardly open annular channel between said flanges receiving said disc.

5. The tachometer defined in claim 4 wherein said body is composed of sintered permanently magnetic ferromagnetic material and said disc is composed of sheet metal.

6. The tachometer defined in claim 1 wherein said member has a pair of annular portions flanking said disc and forming said poles, said tachometer further comprising a stationary electromagnetic coil for magnetizing said portions with opposite magnetic polarity.

7. The tachometer defined in claim 6 wherein at least one of said portions is generally cylindrical and receives said coil.

8. The tachometer defined in claim 7 wherein said coil is mounted on said disc.

9. The tachometer defined in claim 1 wherein said magnetic member includes a rotatable shaft having an end extending into said housing along said axis, a magnetic body mounted on said end of said shaft within said housing and having portions of opposite magnetic polarity flanking said disc, and bearing means rotatably supporting said end of said shaft in said housing adjacent said body.